United States Patent
Schein (10) Patent No.: US 8,300,544 B2
(45) Date of Patent: Oct. 30, 2012

(54) WIRELESS SUBSCRIBER UPLINK (UL) GRANT SIZE SELECTION

(75) Inventor: Brett Schein, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/456,978

(22) Filed: Jun. 25, 2009

(65) Prior Publication Data

US 2010/0008242 A1 Jan. 14, 2010

(51) Int. Cl.
*H04L 12/26* (2006.01)
(52) U.S. Cl. .................................................. 370/252
(58) Field of Classification Search .................. 370/230, 370/230.1, 231–235, 229, 241, 252
See application file for complete search history.

(56) References Cited

U.S. PATENT DOCUMENTS

| | | | | |
|---|---|---|---|---|
| 6,785,252 B1 * | 8/2004 | Zimmerman et al. | ........ | 370/337 |
| 7,599,321 B2 * | 10/2009 | Lee et al. | ........ | 370/320 |
| 7,660,279 B2 * | 2/2010 | Brueck et al. | ........ | 370/328 |
| 7,930,386 B2 * | 4/2011 | Davis et al. | ........ | 709/224 |
| 2003/0103525 A1 * | 6/2003 | Wahl | ........ | 370/465 |
| 2005/0220042 A1 * | 10/2005 | Chang et al. | ........ | 370/278 |
| 2007/0047553 A1 * | 3/2007 | Matusz et al. | ........ | 370/395.42 |
| 2007/0206545 A1 * | 9/2007 | Lee et al. | ........ | 370/338 |
| 2007/0243879 A1 * | 10/2007 | Park et al. | ........ | 455/453 |
| 2007/0258540 A1 * | 11/2007 | Ratasuk et al. | ........ | 375/267 |
| 2008/0019306 A1 * | 1/2008 | Damnjanovic | ........ | 370/329 |
| 2008/0155087 A1 | 6/2008 | Blouin et al. | | |
| 2009/0073922 A1 * | 3/2009 | Malladi et al. | ........ | 370/328 |
| 2009/0103438 A1 * | 4/2009 | Groh et al. | ........ | 370/235 |
| 2009/1034328 | 4/2009 | Groh et al. | | |
| 2009/0141661 A1 * | 6/2009 | Li et al. | ........ | 370/311 |
| 2009/0316630 A1 * | 12/2009 | Yamada et al. | ........ | 370/328 |
| 2010/0014423 A1 * | 1/2010 | Furuskar et al. | ........ | 370/235 |
| 2010/0157915 A1 * | 6/2010 | Tsai | ........ | 370/329 |
| 2010/0177649 A1 * | 7/2010 | Ishii et al. | ........ | 370/252 |
| 2010/0254332 A1 * | 10/2010 | Cho et al. | ........ | 370/329 |

OTHER PUBLICATIONS

Wang, Chan, Zukerman and Harris; May 30, 2008; IEEE; Priority based fair scheduling for Multimedia WiMax Uplink Traffic.*

* cited by examiner

*Primary Examiner* — Chi Pham
*Assistant Examiner* — Robert Lopata
(74) *Attorney, Agent, or Firm* — Sterne Kessler Goldstein & Fox PLLC (57) ABSTRACT

A method and apparatus of a wireless subscriber requesting an Uplink (UL) grant size from a base station (BS) are disclosed. One method includes the subscriber analyzing traffic patterns of uplink data, the subscriber selecting a new grant size based on the analyzed traffic patterns, and the subscriber requesting the new grant size by signaling the new grant size to the BS.

15 Claims, 4 Drawing Sheets

WIRELESS SUBSCRIBER UPLINK (UL) GRANT SIZE SELECTION

FIELD OF THE DESCRIBED EMBODIMENTS

The described embodiments relate generally to wireless communications. More particularly, the described embodiments relate to methods and systems for wireless subscriber uplink grant size selection.

BACKGROUND

An 802.16 family of standards have been developed by the Institute of Electrical and Electronic Engineers (IEEE) to provide for fixed, portable, and/or mobile broadband wireless access (BWA) networks (for example, the IEEE std. 802.16, published 2004 and subsequent revisions). The Worldwide Interoperability for Microwave Access (WiMAX) forum facilitates the deployment of broadband wireless networks based on the IEEE 802.16 standard. In particular, the WiMAX forum ensures the compatibility and inter-operability of broadband wireless equipment.

In downlink transmissions, WiMAX networks may broadcast data packets from a base station (BS) to a subscriber station (SS) or mobile station (MS), whereas in the uplink transmissions, the scheduling services may be designed to support services with different traffic characteristics and Quality of Service (QoS) requirements. A significant benefit of the converged wireless networks, such as a WiMAX network, is in the sharing of the most valuable resources—the wireless spectrum among different services. However, the wireless network convergence in a WiMAX network also comes with some challenges, due to the arbitration of uplink transmission between multiple SSs, as well as the allocation of uplink bandwidth with QoS needed for different services.

It is desirable to have a system and method for adaptively updating wireless uplink scheduling based on characteristics of the uplink data, to improve a user's experience, while minimizing impact on the wireless spectrum.

SUMMARY

An embodiment includes a method of a wireless subscriber requesting an Uplink (UL) grant size from a base station (BS). The method includes the subscriber analyzing traffic patterns of uplink data, the subscriber selecting a new grant size based on the analyzed traffic patterns, and the subscriber requesting the new grant size by signaling the new grant size to the BS.

Another embodiment includes a mobile subscriber. The mobile subscriber including a means for analyzing traffic patterns of uplink data, a means for selecting a new grant size based on the analyzed traffic patterns; and a means for requesting the new grant size by signaling the new grant size to the BS.

Other aspects and advantages of the described embodiments will become apparent from the following detailed description, taken in conjunction with the accompanying drawings, illustrating by way of example the principles of the described embodiments.

DETAILED DESCRIPTION

Embodiments of a wireless subscriber adaptively requesting an Uplink (UL) grant size from a base station (BS) are disclosed. The embodiments include the subscriber analyzing traffic patterns of uplink data, the subscriber selecting a new grant size based on the analyzed traffic pattern, and the subscriber requesting the new grant size by signaling the new grant size to the BS. It is to be understood that the terms subscriber, mobile subscriber (MS), and subscriber station (SS) may be used interchangeably.

Figure 1:
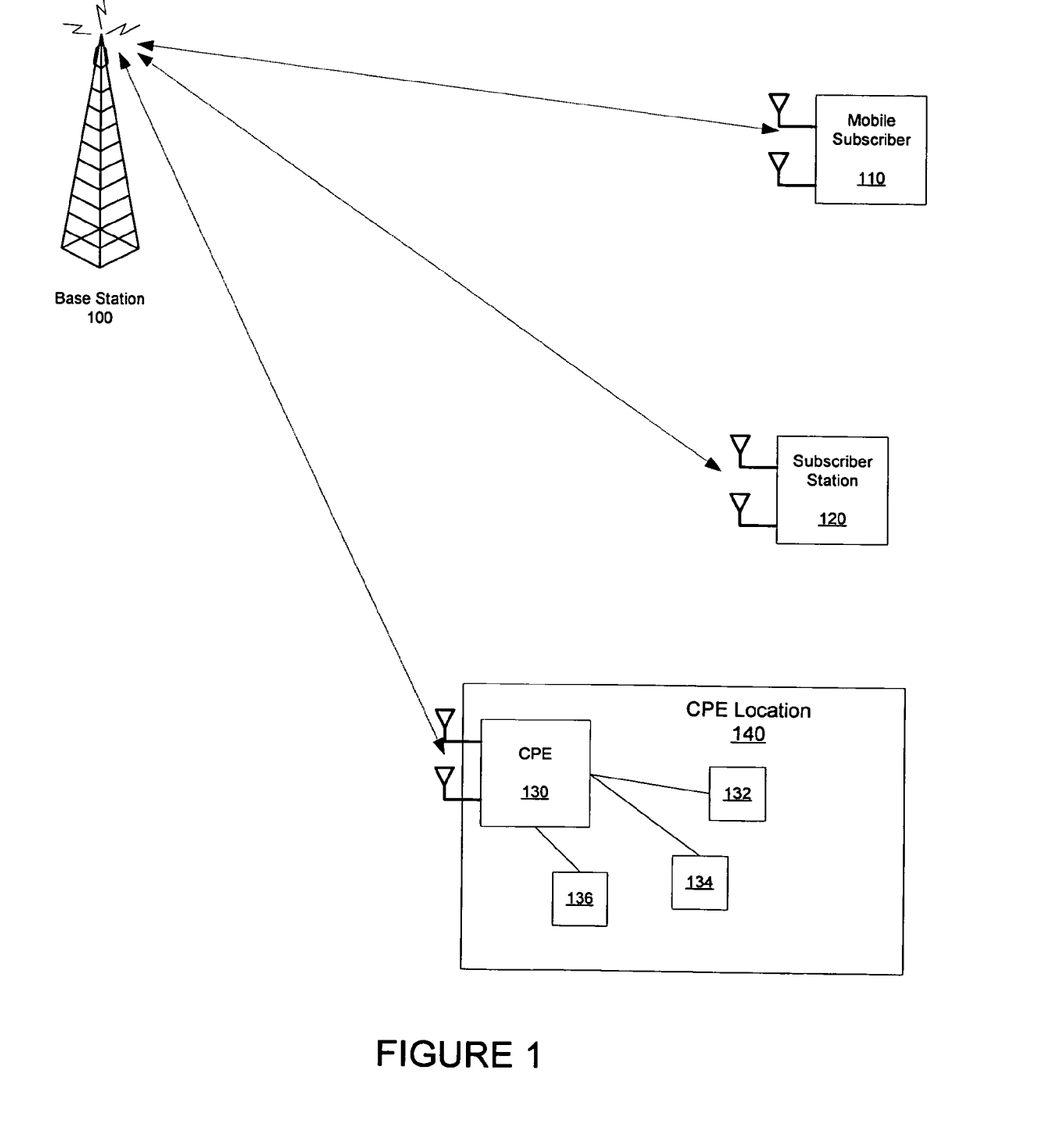
FIG. 1 shows an example of a wireless communications that includes a base station (BS) wirelessly communicating with multiple subscribers.

FIG. 1 shows an example of a wireless communications that includes a base station (BS) 100 wirelessly communicating with multiple subscribers 110, 120, 130. As shown, the subscriber include, for example, a mobile subscriber (MS) 110, a fixed subscriber station (SS) 120, and a CPE (consumer premises equipment) 130. The CPE 130 can physically reside at a user's location 140, and be interfaced with multiple devices 132, 134, 136 at the location 140. Each of the devices 132, 134, 136 can maintain simultaneous two-way wireless communication (data and/or voice) with the BS 100. It is to be understood that in some embodiments, the CPE 130 may be classified as a MS or a BS.

The wireless communication between the BS 100 and the subscribers 110, 120, 130 includes downlink (DL) data traffic (data and/or voice), and uplink (UL) data traffic (data and/or voice). The data traffic includes data packets. An embodiment of the wireless communication system includes the data packets (DL and UL) being scheduled by the BS. The DL scheduling can be performed more efficiently than the UL scheduling because the BS has more complete downlink traffic information than uplink traffic information. That is, the BS directly receives the data traffic for downlink transmission, whereas the data traffic for uplink transmission resides at the subscriber. Therefore, the BS relies to at least some extent on information received from the subscribers for the uplink scheduling.

Voice over internet protocol (VoIP) data packets requires specific timing controls of the UL scheduling of voice data packets. One embodiment of WiMAX (Worldwide Interoperability for Microwave Access) communication implementations includes an unsolicited grant service (UGS) for aiding a base station in UL scheduling. UGS is designed to support real-time service flows that generate fixed-size data packets on a periodic basis, such as VoIP without silence suppression.

Another embodiment of WiMAX communication includes Extended Real-Time Polling Service (ertPS). Extended Real-Time Polling Service (ertPS) is one of the five QOS service types defined in the IEEE 802.16 WiMAX. The 802.16 protocol supports five types of QoS—UGS (Unsolicited grant service), rtPS (Real time polling Service), ertPS (Extended Real-time POLLING SERVICE), nrtPS (Non-real-time polling service and BE (Best effort service). ertPS is a scheduling mechanism that builds on the efficiency of both UGS and rtPS. The ertPS is designed for realtime traffic with variable data rate (such as VOIP service with silence suppression) over the WiMAX network.

802.16 UL ertPS scheduling service was introduced to the WiMAX standard to support a single instance of a silence-suppressed VoIP application per ertPS connection. With ertPS, the MS signals to the BS when VoIP traffic is "on," and the BS responds by scheduling periodic UL grants for the connection. The MS signals to the BS the number of bytes requested for each UL grant—typically equal to one VoIP packet plus MAC overhead. Similarly, the MS signals to the BS when VoIP traffic is "off," and the BS responds by no longer scheduling periodic UL grants for the connection.

Some implementations of wireless systems, however, have limitations and/or imperfections. For example, a one typical limitation includes jitter that occurs between an application and software of the subscriber, and lost scheduling MAPs.

Additionally, it is desirable to enhance the WiMAX standard with extended applications. Desired enhancements include, for example, handling simultaneous VoIP calls and adjusting uplink scheduling accommodate for variable rate CODEC (compression/decompression) data packets streams. Embodiments of adaptively selecting subscriber grant size can address the described WiMAX implantations, limitations, and imperfections, and additionally provide the desired enhancements.

Figure 2:
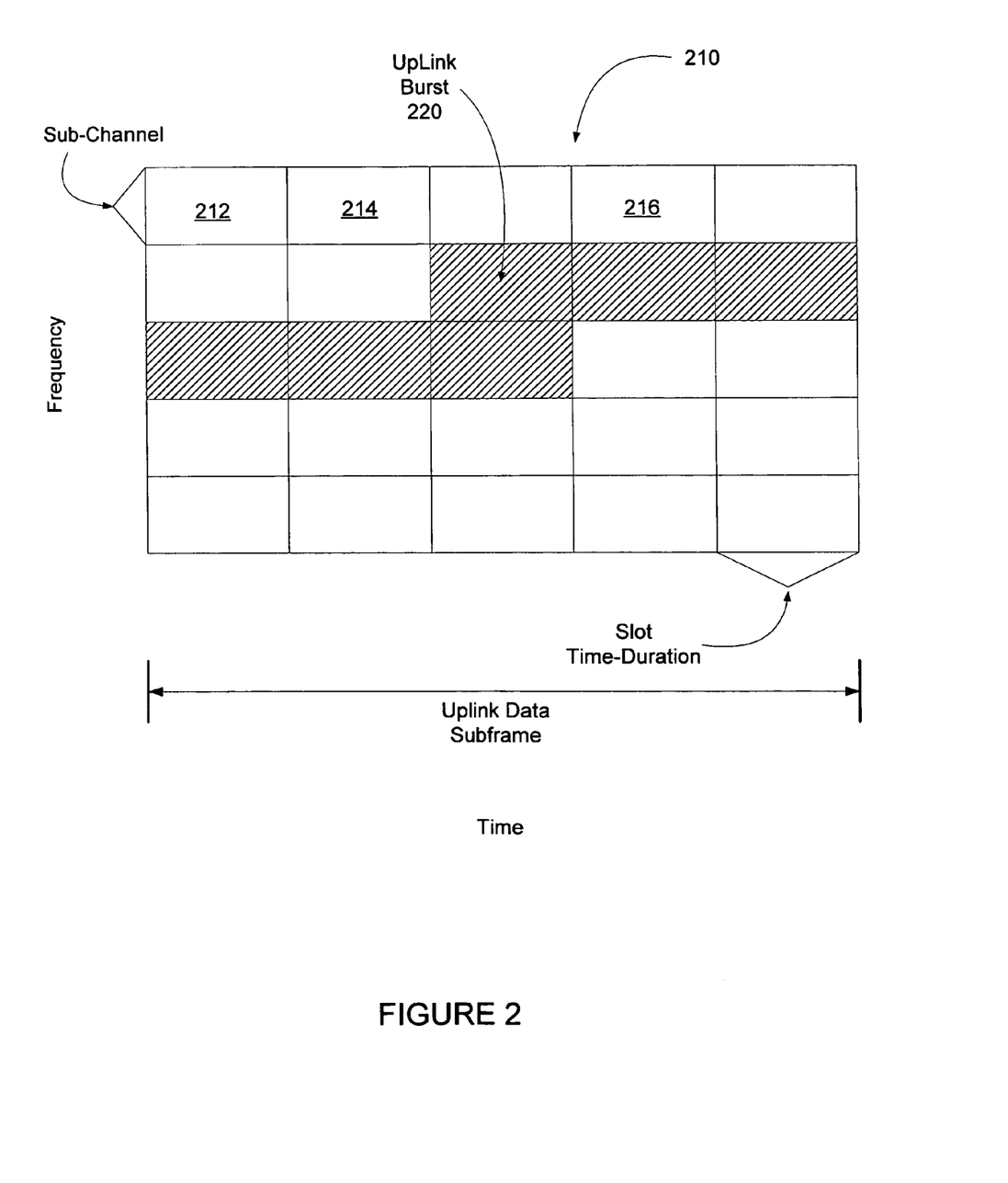
FIG. 2 shows an example of an uplink sub-frame that includes an uplink grant as scheduled by a base station (BS).

FIG. 2 shows an example of an uplink sub-frame 210 that includes an uplink burst 220 as scheduled by a BS. The uplink sub-frame along with a corresponding downlink sub-frame, make up a single frame. As shown, the uplink sub-frame 210 includes slots (for example, slots 212, 214, 216. Each slot includes a single sub-channel (that typically includes multiple sub-carriers of a multi-carrier signal) and is assigned a time duration within the uplink sub-frame 210. The BS specifies which slots are allocated to a subscriber for uplink transmission. The number of bytes included within each slots is typically defined by an MCS (modulation and coding scheme) selected for the uplink transmission, which is typically dependent on the quality of the wireless communication link between the base station and the subscriber.

Embodiments of a WiMAX uplink sub-frame include 128, 256, 512, 1024, 2048 sub-carriers (orthogonal frequency division multiplexing (OFDM) sub-carriers) divided into multiple sub-channels. Additionally, the WiMAX uplink sub-frame includes multiple time-duration slots, wherein the number of time-duration slots is dependent, for example, on a ratio of DL sub-frame size to UL sub-frame size.

As shown, the exemplary burst 220 of FIG. 2 is scheduled for a particular subscriber. A grant size can be defined by an uplink burst size. More specifically, the grant size can be specified by the number of slots allocated within an uplink burst by the BS multiplied by the number of bytes that are included within each slot. When a grant size is requested by a subscriber, the BS adjusts the uplink burst accordingly. That is, the base station schedules the uplink data burst to include a number of bytes as determined by the grant size requested by the subscriber.

The exemplary uplink sub-frame of FIG. 2 includes an uplink burst that is assigned (scheduled) 6 slots. UGS and ertPS assume that data arrives in a regular pattern, and by definition in the WiMAX standard there is an associated unsolicited grant interval, or UGI. The time intervals in which the downlink burst are allocated over multiple frames (downlink sub-frames and corresponding uplink sub-frames) can be dependent upon the Quality of Service (QoS) required by the application of the data packets. The time intervals can be defined by an unsolicited grant interval (UGI). For an embodiment, the UGI is 20 milliseconds, and an uplink data burst occurs once every four uplink sub-frames, wherein the time duration of a frame (uplink sub-frame and downlink sub-frame) is 5 milliseconds.

Figure 3:
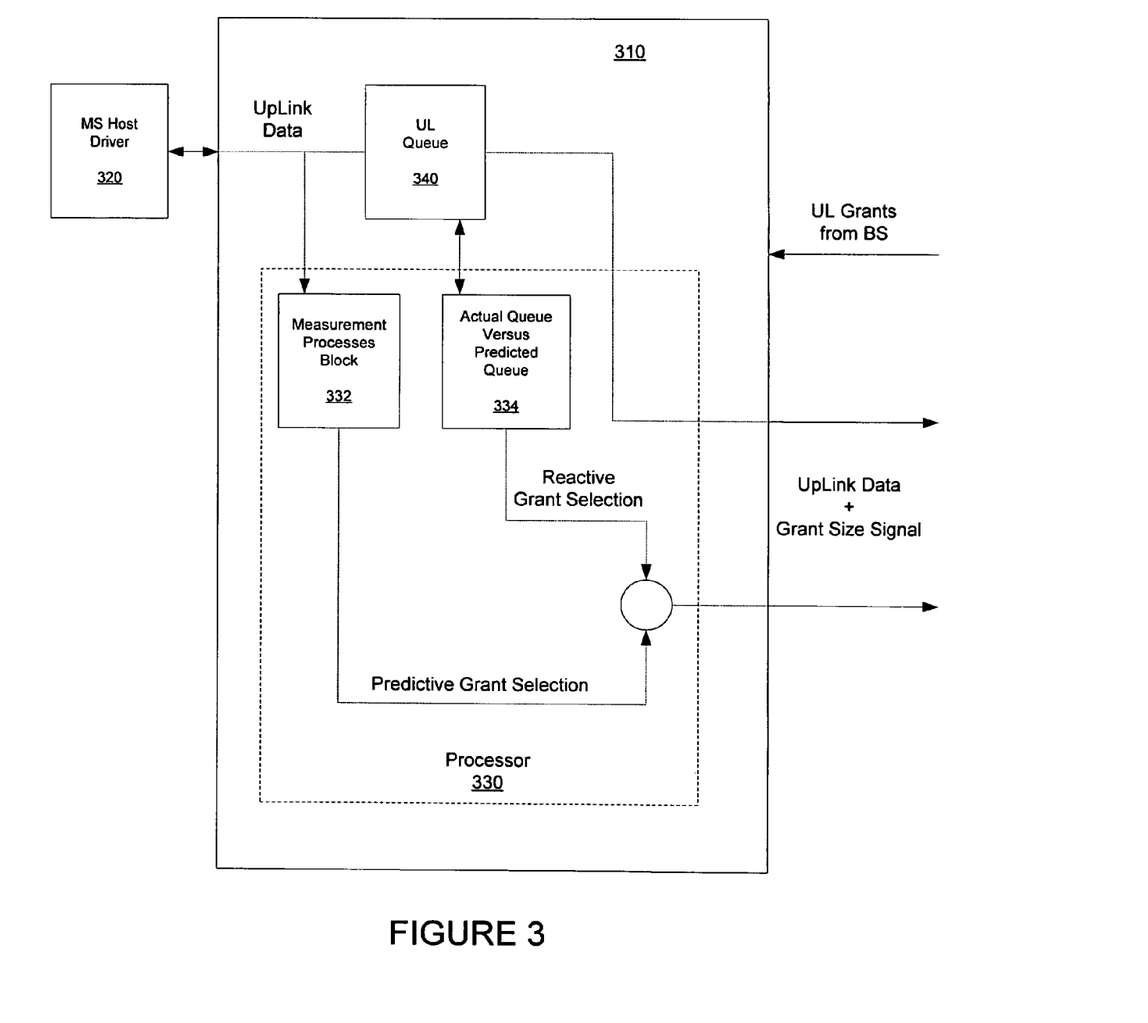
FIG. 3 shows an example of a functional block diagram of a subscriber that includes an adaptive uplink grant selection.

FIG. 3 shows an example of a functional block diagram of a subscriber 310 that includes an adaptive uplink grant selection. It is to be understood that the block diagram of FIG. 3 is an exemplary, and does not suggest an implementation of actual processing blocks. Rather, the block diagram of FIG. 3 provides a depiction of functional blocks for aiding in understanding the described embodiments.

The subscriber 310 receives UL grants from an upstream BS, typically in the form of an uplink transmission schedule that includes uplink burst allocations. The UL data is transmitted from the subscriber 310 to the BS, along with signaling of future selected grant sizes. For the embodiment shown, the subscriber receives the UL data from a host 320. The host 320 can be, for example, a laptop that is interfaced with the subscriber 310. It is to be understood that other embodiments include the host 320 being a part of the subscriber 310.

For other embodiments, the grant size signaling is not sent with the UL data. That is, for example, the grant size signal can be sent only when the desired grant size changes. Additionally, the grant size signal can be sent in a stand alone UL burst.

The block diagram of the subscriber 310 of FIG. 3 includes an uplink data measurement block 332. The uplink data measurement can include, for example, monitoring a number and size of data packets within the uplink data per a unit of time, comparing the number with a previous measurement interval number, comparing a packet size of a most recently received data packet with a previous maximum packet size, and/or tracking a number and size of packets of uplink data per a measurement interval. Based on the measured uplink data, a processor 330 of the subscriber 310 generates a predicted grant selection. That is, the subscriber 310 selects a grant size by predicting future uplink data characteristics based on statistics of previously received uplink data.

The embodiment of the subscriber 310 includes an uplink (UL) queue block 340. For this embodiment, the UL data is queued within the uplink (UL) queue block 340 before being allocated by the processor 330 according to the UL schedule provided by the BS. If the grant size allocation is too small, the data packets within the uplink (UL) queue block 340 will increase. The processor can modify the grant size (that is, selectively increase the grant size) if the actual number of data packets within the uplink (UL) queue block 340 is greater than expected.

For a mode of operation, the queue is expected to be essentially zero, and the grant size is increased if a queue is observed. In other modes of operation, it may be desirable to maintain data packets in the queue for the purpose of efficient use of the air interface. For example, in an embodiment, a voice packet may be allocated once per unsolicited grant interval (UGI), in which a UGI consists of four frames (for example, four WiMAX frames). However, if a situation occurs in which 1.5 voice packets occur per UGI, it is more efficient use of the air interface to request a grant size big enough for 1.5 packets rather than 2 packets. In this situation, the wireless subscriber would maintain a queue of up to 0.5 packets per UGI, and the queue exceeding this amount can be an indicator to increase the grant size.

The selected grant size can include both the predictive and the reactive components that are summed before being communicated to the BS through grant size signaling.

Figure 4:
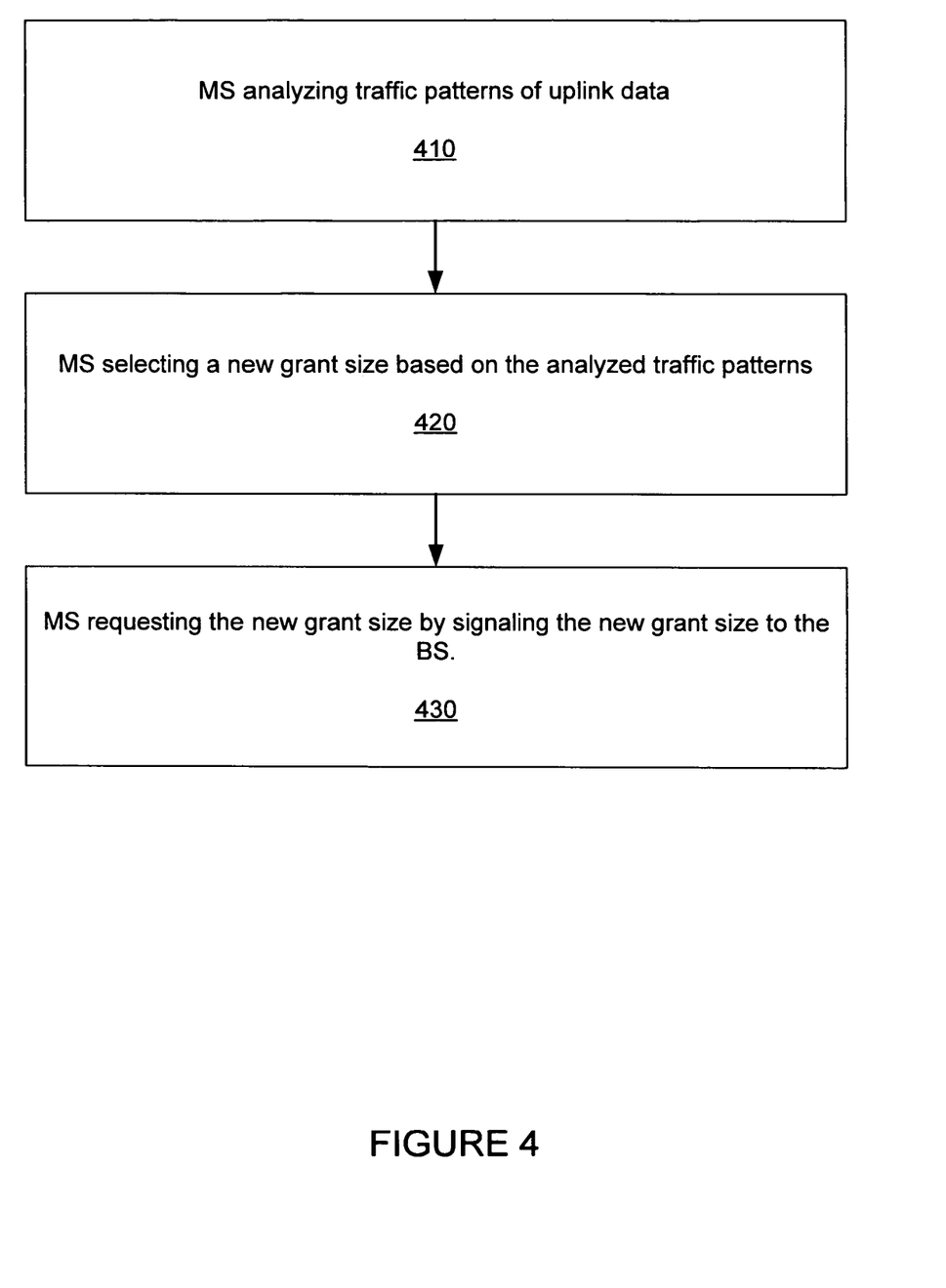
FIG. 4 is a flow chart that includes steps of one example of a method of a wireless subscriber requesting an Uplink (UL) grant size.

FIG. 4 is a flow chart that includes steps of one example of a method of a wireless subscriber requesting an Uplink (UL) grant size. A first step 410 includes the subscriber analyzing traffic patterns of uplink data. A second step 420 includes the subscriber selecting a new grant size based on the analyzed traffic patterns. A third step 430 includes the subscriber requesting the new grant size by signaling the new grant size to the BS.

Generally, the requested new grant size is maintained until another new grant size is requested. It is to be understood, however, that there is no limit on how frequently a new grant size is requested or signaled. Once the BS receives the new grant size, future UL scheduling received by the subscriber is influenced by the new grant size.

A desired enhancement to WiMAX communications includes the ability to multiplex any number of VoIP applications, or other applications each with quasi-static traffic, over a single ertPS connection. Each multiplexed application generally has a different quasi-static traffic pattern, including different size packets and different average inter-packet arrival intervals.

To enable multiplexing of, for example, multiple VoIP applications, an embodiment includes monitoring a number and size of data packets within the uplink data per a unit of time, and selecting the new grant size to just accommodate the monitored number and size of packets. For an embodiment, the unit of time is an unsolicited grant interval (UGI). The new grant size is selected to be large enough to include the monitored number and size of packets without wasting additional bandwidth.

For an embodiment, monitoring of the number and size of data packets per the unit of time is within a measurement interval. For an embodiment, the measurement interval includes a selected number of UGIs. The measurement interval can include a sliding window of UGIs, or blocks of UGIs. An exemplary measurement interval includes 10 UGIs. This embodiment includes comparing the number of data packets per unit of time with a previous measurement interval number of data packets per unit of time. If the number is a threshold amount greater than the previous measurement interval number, then selection of the new grant size is re-initiated.

It is to be understood that the new grant size can be selected to include fragments of packets. Additionally, the grant size can be selected so that a fragment or more packets fit within the selected grant size.

The subscriber measures the number of packets per unit time and the total number of bytes delivered per unit time. The subscriber translates this into a particular number of bytes per unsolicited UL grant, accounting for the number of application bytes per grant interval, number of application packet fragments, MAC overhead for constructing one or more media access control (MAC) protocol data units (PDU's) depending whether UL packing is enabled, and adding extra room for additional signaling to change the unsolicited grant size in future UL grants. The subscriber adapts to changes in the incoming traffic by updating the measurement value, and signaling the computed result to the BS. This accommodates time-variation in the quasi-static traffic, and traffic streams multiplexed with different packet sizes and different packet inter-arrival periods.

Another desired enhancement to WiMAX communications includes the ability to handle variable-rate VoIP applications with instantaneous changes in traffic pattern. Accordingly, and embodiment includes the subscriber analyzing traffic patterns, including comparing a packet size of a most recently received data packet with a previous maximum packet size, and selecting the new grant size based on a ratio of the packet size of a most recently received data packet with the previous maximum packet size. The packet size of the data packets can be determined by a Codec (compression/decompression) processor.

For an embodiment, the previous maximum packets size is generated during a past measurement interval for a first data packet of the present measurement interval, and the previous maximum packet size is determined by a previous data packet of the present interval for other data packets of the present measurement interval. That is, for the first packet of a present interval, the previous maximum packet size is carried over from the previous measurement interval. Once the present measurement interval begins, the packet size of the first packet of the present interval becomes the new maximum packet size, which then can be modified during the present measurement interval by a size of a subsequent packet of the present measurement interval.

For another embodiment, at the end of the measurement interval, the maximum packet size is set to the maximum packet size of the measurement interval that is ending. For the present (next) measurement interval maximum packet size remains that same if smaller sized packets are received, and the maximum packet size is increase to the size of a subsequent packet if the subsequent packet has a packet size bigger than the maximum packet size.

For an embodiment selecting the new grant size based on a ratio of the packet size of a most recently received data packet with the previous maximum packet size includes determining if the packets size of the most recent received data packet is larger than the previous maximum packet size. If it is, then requesting the new grant size includes scaling a previously selected new grant size. Scaling of the previously selected grant size includes computing the ratio (new packet size divided by the previous maximum packet size), multiplying a previous number of application bytes per measurement interval by the ratio, and selecting the new grant size assuming no change in a number of packets within the uplink data per the measurement interval. The application bytes comprise a sum of sizes of packets within a previous measurement interval.

The subscriber instantly adapts to variable rate VoIP codecs when the voice rate instantaneously increases, upon the first incoming larger packet. Upon the first larger packet, the subscriber signals its new requirement to the BS. Without doing this, the subscriber has to learn more slowly about traffic changes, signal later and less precisely to the BS, resulting in increased delay or packet loss. Additionally, without doing this, overhead is increased, and the air-interface efficiency is decreased, due to having to send fragmented packets over the air.

Another desired enhancement to WiMAX communications includes accommodating jitter between application and subscriber firmware, including jitter from the application itself or from the subscriber driver. Accordingly, an embodiment of the subscriber analyzing traffic patterns includes tracking a number and size of packets of uplink data per a measurement interval, and selecting the new grant size based on observation of variations in the number and size of packets between consecutive measurement intervals.

For an embodiment, observation of the variations in the number and size of packets between consecutive measurement intervals includes tracking N consecutive measurement intervals. If the variation in the selected grant size between measurement intervals is less than a threshold, then a new grant size is selected corresponding to a largest selected grant size of the N consecutive measurement intervals. If the variation in the selected grant size between measurement intervals is greater than the threshold, then a new grant size is selected corresponding to the selected grant size of a most recent measurement interval.

Jitter between application and subscriber firmware causes some application packets to arrive earlier or later than their corresponding scheduled UL grants. This results in variation in measured traffic between traffic measurement periods, while the application traffic itself is not characteristically changing. The jitter can be accommodated for by allowing the measured results to vary within a relative fraction of the nominal requested grant size, without changing the requested grant size. Specifically, if the newest selected grant size is less than the last selected grant size, but greater than a fraction of the last selected grant size (for example, 0.8 times the last selected grant size), then the subscriber does not signal for a new grant size. This allows for operation in the presence of jitter, while setting the selected grant size to the maximum grant size needed to accommodate the jitter.

An embodiment includes storing the last 3 computed (selected) grant sizes. If the subscriber has not signaled a new grant size within, for example, the last 3 measurement periods, then the subscriber chooses the maximum value from the last 3 measurement periods and signals that as the new grant size. Therefore, the subscriber is able to adapt to true, small reductions in the traffic characteristics.

Without the jitter accommodation feature, the subscriber would react immediately to every variation in measured traffic. This would cause the request grant size to react to the last measurement period. In the presence of jitter, this can cause the subscriber to request a grant size that is too small half the time. This, in turn, may result in inefficient use of the air-interface, extra MAC overhead, and increased latency or dropped packets.

Another desired enhancement to WiMAX communications includes accommodating for uplink data queue within the subscriber. Uplink queue backups can come about for many reasons, including: a lost FCH/DL-MAP/UL-MAP, temporary link loss due to handoff or deep channel fade, higher priority messages such as handoff messages or competing UL ertPS/UGS connections stealing bandwidth due to subscriber scheduling decision, imprecision in tracking ertPS application requirements, BS loading or poor link quality reducing the UL grant bandwidth, excessive jitter between application and subscriber firmware.

It is not obvious that a subscriber must or should recover from air-interface imperfections that affect its ertPS connection. For example, for UGS, the standard states that the subscriber may signal for the BS to add up to 1% additional bandwidth. ertPS is modeled after UGS, in that it is supposed to be a quasi-fixed rate UL connection.

Accordingly, an embodiment includes reactively updating the new grant size based on a data packet uplink queue. This includes comparing the data packet uplink queue with an expected data packet uplink queue, increasing the new grant size by the amount the data packet uplink queue exceeds the expected data packet uplink queue.

The predictive grant selections include computing one grant size contribution only from the traffic flowing into the subscriber firmware. A second contribution from the current depth of the UL queue can be added. For an embodiment, the summed result is then signaled in the GMSH (grant management sub-header) transmitted in the unsolicited UL grant—letting the subscriber request a different adjustment on successive unsolicited grants. It is possible to alternatively use other forms of signaling.

The subscriber can modularize the problems into two independent problems, separating incoming traffic characteristics from air-interface imperfections. Further, basing the second contribution on the UL queue depth, and comparing with measurement statistics, allows the subscriber to recover from almost any sort of air-interface imperfection. The subscriber applies different time scales to the different problems, as ertPS application traffic characteristics are targeted as quasi-static, while air-interface imperfections may occur on a frame-by-frame basis.

Although specific embodiments have been described and illustrated, the embodiments are not to be limited to the specific forms or arrangements of parts so described and illustrated. The invention is limited only by the appended claims.

What is claimed:

1. A method of a wireless subscriber for requesting an Uplink (UL) grant size, comprising:
   analyzing traffic patterns of uplink data packets;
   calculating a ratio as a packet size of a current data packet divided by a previous maximum packet size:,
   selecting a new grant size as a current grant size multiplied by the ratio; and
   requesting the new grant size by signaling the new grant size to the base station (BS).

2. The method of claim 1, wherein the requested new grant size is maintained until another new grant size is requested.

3. The method of claim 1, wherein future UL scheduling includes the new grant size.

4. The method of claim 1, wherein analyzing traffic patterns comprises:
   monitoring a number and size of data packets within the uplink data per a unit of time; and
   selecting the new grant size to just accommodate the monitored number and size of packets.

5. The method of claim 4, wherein the monitoring of the number and size per unit of time is performed for a measurement interval, the method further comprising:
   comparing the number with a second number of data packets per unit time measured in a previous measurement interval; and
   if the number is a threshold amount greater than the second number measured in the previous measurement interval, then re-initiating selection of the new grant size.

6. The method of claim 4, wherein the new grant size comprises at least a fragment of a packet.

7. The method of claim 1, wherein the packet size of the data packets is determined by a CODEC (compression/decompression) processor.

8. The method of claim 1, wherein the analyzing traffic patterns comprises:
   tracking a number and size of packets of uplink data within a plurality of measurement intervals; and
   selecting the new grant size based on observation of variations in the number and size of packets between consecutive measurement intervals.

9. The method of claim 8, wherein the observation of the variations in the number and size of packets between consecutive measurement intervals comprises:
   tracking N consecutive measurement intervals;
   if the variation in the number and size of packets between measurement intervals is less than a threshold, then the new grant size is selected to be equal to a largest sum of packet sizes from among the N consecutive measurement intervals; and
   if the variation in the number and size of packets selected grant size between measurement intervals is greater than the threshold, then the new grant size is selected to be equal to a sum of packet sizes within a most recent measurement interval.

10. The method of claim 1, further comprising reactively updating the new grant size based on a data packet uplink queue.

11. The method of claim 10, wherein reactively updating the new grant size based on a data packet uplink queue comprises:
    comparing the data packet uplink queue with an expected data packet uplink queue; and increasing the new grant size by the amount the data packet uplink queue exceeds the expected data packet uplink queue.

12. A method of a wireless system scheduling Uplink (UL), comprising:
   receiving a grant size from a base station (BS) of the wireless system;
   analyzing traffic patterns of uplink data packets;
   calculating a ratio as a packet size of a current data packet divided by a previous maximum packet size;
   selecting a new grant size as a current grant size multiplied by the ratio; and
   requesting the new grant size by signaling the new grant size to the BS;
   the BS performing UL scheduling that includes the new grant size.

13. A mobile subscriber device comprising:
   one or more processors configured to analyze traffic patterns of uplink data packets;
   the one or more processors configured to calculate a ratio as a packet size of a current data packet divided by a previous maximum packet size;
   the one or more processors configured to select a new grant size as a current grant size multiplied by the ratio; and
   the one or more processors configured to request the new grant size by signaling the new grant size to the BS.

14. The mobile subscriber device of claim 13, further comprising:
   the one or more processors configured to monitor a number and size of data packets within the uplink data per a unit of time; and
   the one or more processors configured to select the new grant size to accommodate the monitored number and size of packets.

15. The method of claim 8, wherein the selecting the new grant size includes comparing packet sizes of data packets of a present measurement interval to a previous maximum packet size, and
   wherein, for a first data packet of the present measurement interval, the previous maximum packet size is a maximum packet size of a past measurement interval, and for other data packets of the present measurement interval, the previous maximum packet size from among previously-measured data packets of the present measurement interval.

* * * * *

UNITED STATES PATENT AND TRADEMARK OFFICE
CERTIFICATE OF CORRECTION

PATENT NO. : 8,300,544 B2  
APPLICATION NO. : 12/456978  
DATED : October 30, 2012  
INVENTOR(S) : Schein Page 1 of 1

It is certified that error appears in the above-identified patent and that said Letters Patent is hereby corrected as shown below:

Title page, add beneath Item (65)
-- Related U.S. Application Data
(60) Provisional Application No. 61/134,631, filed on July 11, 2008 --

Column 8, line 10, replace ":," with -- ; --

Signed and Sealed this
Fifth Day of February, 2013

Teresa Stanek Rea
*Acting Director of the United States Patent and Trademark Office*